Sept. 16, 1947.　　　R. D. HICKOK ET AL　　　2,427,529
METER PIVOT
Filed July 26, 1944
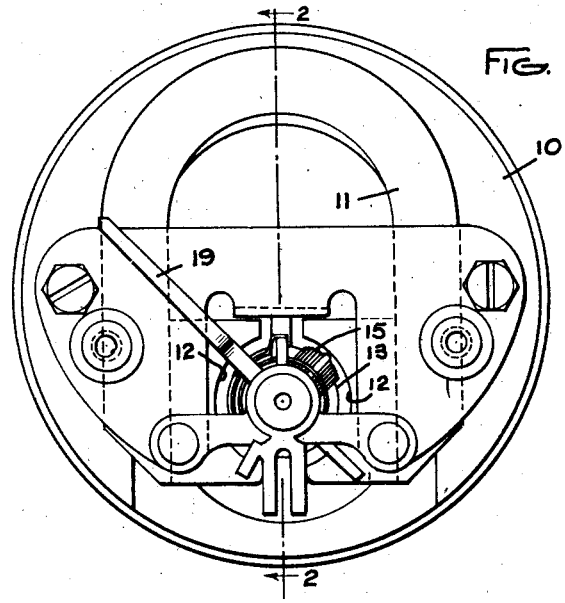
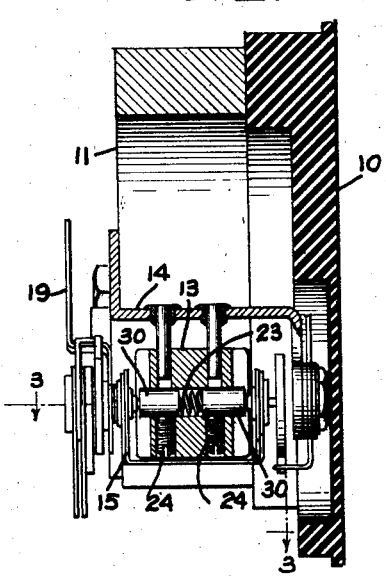
INVENTORS
ROBERT D. HICKOK AND
LAWRENCE D. MONTGOMERY
BY Hyde and Meyer
ATTORNEYS.

Patented Sept. 16, 1947

2,427,529

UNITED STATES PATENT OFFICE 2,427,529

METER PIVOT

Robert D. Hickok, Bratenahl, and Lawrence D. Montgomery, Shaker Heights, Ohio, assignors to Cleveland Patents, Incorporated, Cleveland, Ohio, a corporation of Ohio Application July 26, 1944, Serial No. 546,700

2 Claims. (Cl. 171—95)

This invention relates to measuring or indicating instruments and more particularly to the pivots for the rotating elements thereof. The most delicate feature of any measuring or indicating instrument embodying a rotating element, typified by an electric meter, has always been the bearings for such element. These have always been of the well-known V jewel and cone type, with conical side walls inclined at an angle of about 90°, and in which the conical point of a hard metal shaft has been rounded to a very small radius, on the order of .001 inch, and rests in a concave seat in the bottom of a conical recess or socket in a sapphire or other V jewel rounded to a larger radius of the order of .004 or .006 inch. This type of bearing causes very little friction, but it is quite susceptible to injury if it is dropped or otherwise jarred severely, a common occurrence with portable instruments, in which case the very small radii of the pivot parts (cone and V jewel) concentrate any applied force on a very small area—a few millionths of a square inch—which means that only a few ounces of total pressure runs up into astronomical figures when computed as pounds per square inch.

To overcome this inherent delicacy in instruments of this class, the present invention aims to provide improved pivot means therefor designed to prevent application to the delicate parts of more than a very limited small amount of pressure which they are built to withstand, so that no matter how severe is the shock to the instrument as a whole, from dropping, jarring or other mishandling, the pivot parts will not suffer distortion, injury or loss of delicacy and accuracy in operation.

Another object is to provide improved pivot means of the kind described, in which those parts ordinarily liable to injury, as described, are both cushioned against it and include means by which shocks, blows, impacts or pressure beyond their capacity to withstand are transferred and applied to other stronger parts specially provided and arranged for the purpose.

Further objects of the invention in part are obvious and in part will appear more in detail hereinafter.

In the drawings,

Fig. 1 is a front elevation of one form of instrument embodying the invention;

Fig. 2 is a detail sectional elevation thereof, on the line 2—2, Fig. 1, looking in the direction of the arrows;

Fig. 3 is a detail sectional view, on a larger scale, on the line 3—3, Fig. 2, the rotating member or coil being turned to bring it into the sectional plane; and Fig. 4 is a detail section, enlarged, corresponding to Fig. 3; and Fig. 5 is a view, corresponding to Fig. 3 and showing the invention applied to another form of instrument.

The invention may be applied to any form of instrument or device which includes relatively stationary and rotatable members or elements interconnected by delicate V jewel pivots of the character described. The rotatable member is usually of very light weight, of the order of less than 1 gram, and may either rotate continuously in one direction, as occurs in certain delicate physical instruments including a very small pivoted mirror, or back and forth, as with the pointer carrying rotating coil member of an electric meter. The drawings show the latter arrangement, but only for purposes of illustration and not in any sense of limitation.

Figs. 1 to 3, inclusive, show the invention applied to an electric meter or indicating instrument of the inside pivot form, i. e., the rotating element or coil member surrounds and turns about a stationary core to which it is pivotally connected. In general the meter is of the form shown in the prior application for Electric meter, Serial No. 483,925, filed April 21, 1943, by one of us, Robert D. Hickok, now Patent No. 2,355,649, August 15, 1944, and to which reference may be had if desirable or necessary.

The meter shown includes a base or body 10 carrying a U-shaped permanent magnet 11 provided with pole pieces 12 between which is rigidly mounted a generally cylindrical stationary element or core 13 supported by a plate member 14 rigidly attached to the base. This core forms the support for the rotating element, which in this case is a coil member, marked generally 15, consisting of a wire coil carried on a light metal frame. To secure the highest possible degree of sensitivity, the rotating coil member is mounted in the stationary frame on nearly friction-free bearings consisting of cone and V jewel members, one of which, either one, is made yieldable, and either of which (cone or V jewel) may be carried by the rotating element.

In the particular meter shown, the coil member is provided with two diametrically opposite alined pivot members 17, each of which extends inwardly toward the core and enters and is seated in a V jewel member 18 carried by the core. Hence the rotating coil member is rotatably mounted upon the stationary frame, and a pointer 19 attached to the coil member, may be caused to move to various positions on the scale or dial (not shown) as is usual.

Each pivot member 17 consists of a short piece of cylindrical hardened steel rod or wire of small diameter, say .020' to .030 inch, forming a shank which is firmly anchored in an opening in and secured to the metal frame of the rotating element 15 and which also extends through one or more collars 20 of washer form also anchored in place, as by being a press fit on the shank, or by the use of cement. The pivot end is conical, as at 21, the extreme end being rounded off on a small radius, of the order of .001 inch, too small to illustrate in the drawing. Therefore, the complete assembled rotating element includes not only the frame, wire coil, and pointer, but also two like pivot members, axially alined, located on opposite sides of the frame and extending inwardly toward each other.

The V jewel members, marked generally 18, are alike, so that one only will be described. As shown in said prior application, both are here mounted in the core, and more particularly in opposite ends of a through axial opening 22 thereof. A spring 23 between them normally urges them apart, but each may be locked in its final operating position by a set screw 24. Spring 23 is just strong enough to support the weight of the jewel member, including its sliding friction in the core, a weight of the order of 5 mg.

Each jewel mount includes a small tube, sleeve or thimble 30 in the bore of which is slidable a cylindrical brass block or short rod 31 in one end of which is set the sapphire or other jewel 32 having a generally conical or cupped recess or seat, the bottom of which is concaved on a radius larger than that of the pivot pin, say of the order of .004 to .006 inch. Block 31, with its V jewel, is urged toward the pivot pin by a light spring 34, but such motion is limited by the cross wall 35 at the end of thimble 30, which wall has an opening 36 through which the pivot pin extends. Opening 36 is .003 to .005 inch larger in diameter than the pivot pin. Spring 34 has strength just sufficient to lift the assembled rotating element, whose weight is of the order of 500 mg. It is very much stronger than spring 23. The opposite end of the sleeve 30 may be closed or its edges spun over slightly, as at 37, or otherwise formed, to hold the spring 34 in place.

The parts are so proportioned, particularly the length of the pivot pin from collar 20 to the end of the cone, that when all parts are assembled in operating position, with both pivot pins resting in their jewel seats, as in Figs. 3 and 4, there is a very slight clearance 38 of the order of, say .004 to .006 inch, between the collar 20 and the adjacent end of the tube 30, as well as a slight clearance, of more or less like order, between the end of the block 31 and the cross wall 35, both clearances being shown somewhat exaggerated, in the drawings, for better illustration.

The parts are assembled in the manner described in my prior application referred to. With two complete jewel members in the core, they are pushed back to compress spring 23 and the set screws 24 are tightened. The coil member is then laid in place with its pivot pins opposite the jewels. Screws 24 are released to permit the jewel members to move out until the pins are seated in the jewels. After endwise adjustment of the coil and jewel members to center the coil endwise with reference to the core and a very slight outward adjustment or separation of members 30 to subject the pivot pins to the yielding pressure of springs 34, the screws 24 are again locked. The coil is now freely pivoted upon the core and may turn freely about its axis, being subject only to friction of the rotating parts and the maintained light pressure of springs 34. Yet the pivot parts are amply protected against injury. For example, upon the occurrence of any jar, impact or blow which might cause the coil member suddenly to descend, moving to the left in Fig. 3, the upper V jewel and the block 31 in which it is mounted move down and further compress the spring 34, which is a very light spring. But before any substantial or deforming pressure can be applied to or become effective upon the pivot pin, the upper collar 20 seats upon thimble 30 and limits or prevents further motion. At the lower pivot the hole 36 in the cross wall 35 is long enough to prevent escape of its pivot either from said hole or from the conical recess in the V jewel, and is small enough to restrain undue lateral movement. Consequently all shock which otherwise might injure the delicate pivot point is transferred to and absorbed by the stationary core and solid frame, without harm to delicate parts.

Fig. 5 shows the invention applied to another form of meter with outside pivots, as in the prior Patent No. 2,245,781, for Electrical meter, granted June 17, 1941, to Robert D. Hickok, to which reference may be had.

In this arrangement, the coil member 15a has two alined pivot pin members 17a extending outwardly instead of toward each other, as before. Each sleeve or thimble 30a, instead of being mounted in the core, is here fastened to the stationary frame independently of the core. As shown each sleeve 30a is externally threaded and is screwed into an opening in a bar, shown conventionally at 50, which may be assumed to be either the frame itself or a part secured to the frame. This threaded connection enables each jewel member to be adjusted relative to its pivot pin to secure the small clearance 38, before referred to. The manner of securement of the pivot pins to the coil member, and of the V jewels and jewel blocks in sleeves 30a, and their relation to each other and their manner of operation, are the same as before, except for the reversal in position, and require no description.

Further advantages of the invention will be apparent to those skilled in the art.

What we claim is:

1. In a delicate mechanism of the character described, the combination with a stationary frame element and a movable element mounted for turning motion with respect thereto, of low friction pivotal bearing connections between said elements at opposite ends of the movable element, each of said connections including a pivot member rigidly mounted upon the movable element and having a shank the end portion of which is tapered to conical form and the base of which is provided with a washer form collar presenting forwardly toward the point of the cone an abutment surface lying in a transverse plane, and a tubular holder adjustably mounted in the stationary element and provided at its forward end with a cross wall having an opening through which the pivot shank extends, a V jewel mounted for longitudinal movement in said holder and having a socket, and a spring normally effective upon said jewel to maintain light yielding pressure of the pivot point in said socket, the holder, when the parts are in operative position, being adjusted to and occupying a position where its end wall is closely spaced from the transverse abutment surface of the pivot pin collar, whereby escape of either pivot pin from its socket or from its position within its holder opening is prevented and endwise shocks are transmitted from the pivot pin directly to the holder cross wall, for the purposes described.

2. In a delicate mechanism of the character described, the combination with a stationary frame element and a movable element mounted for turning motion with respect thereto, of low friction pivotal bearing connections between said elements at opposite ends of the movable element, each of said connections including a pivot member rigidly mounted upon the movable element and having a shank the end portion of which is tapered to conical form and the base of which is provided with a washer form collar presenting forwardly toward the point of the cone an abutment surface lying in a transverse plane, and a tubular holder adjustably mounted in the stationary element and provided at its forward end with a cross wall having an opening through which the pivot shank extends, and which is slightly larger than said shank to provide close lateral clearance between the cylindrical surfaces of the shank and holder, a V jewel mounted for longitudinal movement in said holder and having a socket, and a spring normally effective upon said jewel to maintain light yielding pressure of the pivot point in said socket, the holder, when the parts are in operative position, being adjusted to and occupying a position where its end wall is closely spaced from the transverse abutment surface of the pivot pin collar, whereby escape of either pivot pin from its socket or from its position within its holder opening is prevented and lateral and endwise shocks are transmitted from the pivot pin directly to the holder cross wall, for the purposes described.

ROBERT D. HICKOK.
LAWRENCE D. MONTGOMERY.

REFERENCES CITED

The following references are of record in the file of this patent:

UNITED STATES PATENTS

| Number | Name | Date |
|---|---|---|
| 1,843,868 | Copelin | Feb. 2, 1932 |
| 1,866,478 | Mortensen | July 5, 1932 |
| 2,330,729 | Meredith | Sept. 28, 1943 |
| 1,022,503 | Pratt | Apr. 9, 1912 |
| 1,830,032 | Kohler | Nov. 3, 1931 |
| 919,171 | Hodge | Apr. 20, 1909 |
| 1,792,385 | Matthews | Feb. 10, 1931 |
| 908,427 | Stevens | Dec. 29, 1908 |

FOREIGN PATENTS

| Number | Country | Date |
|---|---|---|
| 50,655 | Switzerland | Nov. 18, 1909 |